United States Patent
Garnweidner et al.

(10) Patent No.: US 11,267,416 B2
(45) Date of Patent: Mar. 8, 2022

(54) CROSSMEMBER AND METHOD FOR MANUFACTURING A CROSSMEMBER

(71) Applicant: MAGNA INTERNATIONAL INC., Aurora (CA)

(72) Inventors: Peter Garnweidner, Lamprechtshausen (AT); Michael Blümel, Flatz (AT); Gergely Povolnik, Gàrdony (HU)

(73) Assignee: MAGNA INTERNATIONAL INC., Aurora (CA)

( * ) Notice: Subject to any disclaimer, the term of this patent is extended or adjusted under 35 U.S.C. 154(b) by 135 days.

(21) Appl. No.: 16/855,297

(22) Filed: Apr. 22, 2020

(65) Prior Publication Data

US 2020/0247339 A1    Aug. 6, 2020

Related U.S. Application Data

(62) Division of application No. 15/766,822, filed as application No. PCT/CA2016/051190 on Oct. 13, 2016, now Pat. No. 10,668,879.

(30) Foreign Application Priority Data

Oct. 16, 2015   (DE) .................... 10 2015 117 700.5

(51) Int. Cl.
  *B60J 7/00*     (2006.01)
  *B60R 19/18*    (2006.01)
  *B60R 19/24*    (2006.01)

(52) U.S. Cl.
  CPC .............. *B60R 19/18* (2013.01); *B60R 19/24* (2013.01); *B60R 2019/182* (2013.01); *B60R 2019/186* (2013.01); *B60R 2019/247* (2013.01)

(58) Field of Classification Search
  CPC ..... B29C 66/71; B29C 66/7212; B29C 48/12; B60R 19/18; B60R 2019/182; B60R 19/34; Y02E 60/10; B60K 1/04; H01M 50/20

See application file for complete search history.

(56) References Cited

U.S. PATENT DOCUMENTS 4,422,680 A * 12/1983 Goupy .................... B60R 19/04
                                                              264/137
4,482,180 A * 11/1984 Huber ..................... B60R 19/18
                                                              293/120

(Continued)

FOREIGN PATENT DOCUMENTS

CN         1659067 A      8/2005
CN       100421999 C     10/2008

(Continued)

OTHER PUBLICATIONS

English translation of First Office Action regarding corresponding CN App. No. 201680060155.1; dated Oct. 9, 2020.

*Primary Examiner* — Kiran B Patel
(74) *Attorney, Agent, or Firm* — Dickinson Wright PLLC

(57) ABSTRACT

A crossmember for a bumper includes an extruded profile base frame with at least two connecting areas, for attaching the crossmember to a vehicle structure, and which are set at a distance from each other along a longitudinal direction. An extruded reinforcing element is fixedly secured to a rear side of the extruded profile base frame between the at least two connecting areas. The crossmember is weight-optimized and which can be produced in a cost-effective manner.

7 Claims, 5 Drawing Sheets

(56) References Cited

U.S. PATENT DOCUMENTS

| | | | |
|---|---|---|---|
| 4,563,028 A * | 1/1986 | Ogawa | B60R 19/18 293/122 |
| 4,762,352 A * | 8/1988 | Enomoto | B60R 19/18 293/120 |
| 4,940,270 A * | 7/1990 | Yamazaki | B60R 19/18 293/110 |
| 5,056,861 A * | 10/1991 | Garnweidner | B60J 5/0444 296/187.12 |
| 5,407,239 A * | 4/1995 | Arai | B60R 19/18 293/102 |
| 5,462,325 A * | 10/1995 | Masuda | B60R 19/18 293/102 |
| 6,003,912 A * | 12/1999 | Schonhoff | E02D 3/10 293/122 |
| 6,179,355 B1 * | 1/2001 | Chou | B60R 19/18 188/377 |
| 6,209,934 B1 * | 4/2001 | Sakuma | B60R 19/18 293/120 |
| 6,299,226 B1 * | 10/2001 | Kroning | B60R 19/18 293/120 |
| 6,318,775 B1 * | 11/2001 | Heatherington | B60R 19/18 293/120 |
| 6,361,092 B1 * | 3/2002 | Eagle | B60R 19/18 188/371 |
| 6,435,579 B1 * | 8/2002 | Glance | B60R 19/18 293/102 |
| 6,481,690 B2 | 11/2002 | Kariasumari et al. | |
| 6,808,215 B2 * | 10/2004 | Sakuma | B60R 19/34 293/102 |
| 6,971,691 B1 * | 12/2005 | Heatherington | B60R 19/18 293/102 |
| 6,986,536 B1 * | 1/2006 | Heatherington | B60R 19/03 293/102 |
| 7,210,719 B2 * | 5/2007 | Honda | B60R 19/18 293/102 |
| 7,340,833 B2 * | 3/2008 | Weissenborn | B29C 44/08 29/527.1 |
| 7,357,432 B2 * | 4/2008 | Roll | B60R 19/18 293/120 |
| 7,537,252 B2 * | 5/2009 | Nagai | B60R 19/18 293/102 |
| 7,665,778 B2 * | 2/2010 | Henseleit | B60R 19/18 293/102 |
| 8,070,215 B2 * | 12/2011 | Yoshioka | B62D 25/025 296/187.12 |
| 8,276,954 B2 * | 10/2012 | Handing | B60R 19/03 293/133 |
| 8,308,207 B2 * | 11/2012 | Fang | F16F 7/12 293/132 |
| 8,562,041 B2 * | 10/2013 | Kinefuchi | B60R 19/03 293/102 |
| 9,079,552 B2 * | 7/2015 | Matuschek | B60R 19/34 |
| 9,283,908 B2 * | 3/2016 | Blumel | B21D 53/88 |
| 9,399,489 B2 * | 7/2016 | Iwama | B60R 19/26 |
| 9,522,644 B2 * | 12/2016 | Prasoody | B60R 19/34 |
| 9,573,542 B2 * | 2/2017 | Kaneko | B60R 19/18 |
| 10,059,290 B2 * | 8/2018 | Nakajima | B60R 19/18 |
| 10,696,252 B2 * | 6/2020 | Hasegawa | B60R 19/023 |
| 10,974,673 B2 * | 4/2021 | Hashimura | B60R 19/34 |
| 11,007,957 B2 * | 5/2021 | Yokota | B60R 19/24 |
| 11,072,300 B2 * | 7/2021 | Menegazzi | B60R 19/18 |
| 2002/0047281 A1 * | 4/2002 | Hartel | B60R 19/18 293/102 |
| 2003/0034661 A1 * | 2/2003 | Gotanda | B60R 19/24 293/155 |
| 2004/0108737 A1 * | 6/2004 | Evans | B60D 1/56 293/117 |
| 2005/0213478 A1 * | 9/2005 | Glasgow | B60R 19/18 369/262 |
| 2006/0017294 A1 | 1/2006 | Omura et al. | |
| 2009/0267368 A1 * | 10/2009 | Hashimura | B60R 19/18 293/132 |
| 2010/0127519 A1 * | 5/2010 | Wakabayashi | B60R 19/18 293/120 |
| 2012/0025545 A1 * | 2/2012 | Haneda | B60R 19/18 293/102 |
| 2014/0203576 A1 * | 7/2014 | Handing | B60R 19/023 293/102 |
| 2015/0307045 A1 * | 10/2015 | Matecki | B60R 19/18 293/122 |
| 2015/0336526 A1 * | 11/2015 | Handing | B60R 19/34 293/133 |
| 2016/0101753 A1 * | 4/2016 | Higashimachi | B60R 21/0136 293/117 |
| 2016/0137150 A1 * | 5/2016 | Garnweidner | B23K 1/008 293/121 |
| 2016/0159300 A1 * | 6/2016 | Matecki | B60R 19/18 293/120 |
| 2016/0244013 A1 * | 8/2016 | Mori | B60R 19/18 |
| 2016/0280163 A1 * | 9/2016 | Matecki | E04C 3/06 |
| 2016/0347270 A1 * | 12/2016 | Higashimachi | B60R 19/48 |
| 2017/0043735 A1 * | 2/2017 | Yamaguchi | B60R 19/483 |
| 2017/0050674 A1 * | 2/2017 | Wolf-Monheim | B62D 21/11 |
| 2017/0129431 A1 * | 5/2017 | Rabe | B60R 19/20 |
| 2017/0129432 A1 * | 5/2017 | Daido | B62D 21/152 |
| 2017/0144619 A1 * | 5/2017 | Shamoto | B60R 19/023 |
| 2018/0162302 A1 * | 6/2018 | Kitakata | B60R 19/18 |
| 2018/0257586 A1 * | 9/2018 | Kitakata | B60J 5/0484 |
| 2018/0361968 A1 * | 12/2018 | Yatsunami | B60R 19/18 |
| 2019/0084512 A1 * | 3/2019 | Takayanagi | B60R 19/22 |
| 2019/0291670 A1 * | 9/2019 | Toelle | B60R 19/34 |
| 2019/0315299 A1 * | 10/2019 | Bader | B60R 19/03 |
| 2020/0122663 A1 * | 4/2020 | Nilsson | B60R 19/18 |
| 2020/0317149 A1 * | 10/2020 | Honing | B60R 19/18 |
| 2020/0339052 A1 * | 10/2020 | Rebstock | B21D 28/26 |

FOREIGN PATENT DOCUMENTS

| | | |
|---|---|---|
| CN | 101346259 A | 1/2009 |
| CN | 101952143 A | 1/2011 |
| JP | 2001239903 A | 9/2001 |
| JP | 4787728 B2 | 10/2011 |

* cited by examiner

CROSSMEMBER AND METHOD FOR MANUFACTURING A CROSSMEMBER

CROSS-REFERENCE TO RELATED APPLICATIONS

This U.S. Divisional Patent Application claims the benefit of and priority to U.S. National Stage patent application Ser. No. 15/766,822 filed Apr. 8, 2018 entitled "Crossmember And Method For Manufacturing A Crossmember," which claims the benefit of and priority to PCT International Patent Application Serial No. PCT/CA2016/051190 filed Oct. 13, 2016 which claims the benefit of and priority to DE Patent Application Serial No. DE 10 2015 117 700.5 filed Oct. 16, 2015, the entire disclosures of these applications are hereby incorporated by reference.

FIELD OF THE INVENTION

The present invention relates generally to a crossmember for a bumper, and more particularly to a crossmember including a profile base frame and a separate reinforcing element.

BACKGROUND

In practice, a bumper crossmember is usually connected to a vehicle structure at its two longitudinal ends via energy-absorbing elements, for example via so-called crash-boxes. The bumper crossmember directs impact energy into the energy-absorbing elements, in order to convert kinetic energy into deformation energy and to thereby sustain the vehicle structure in the event of a collision, in particular the left and right longitudinal beams of the vehicle chassis during severe accidents.

In the event of a head-on collision, in particular with reference to barriers that are arranged centrally in relation to the vehicle, the maximum bending moment in a bumper crossmember usually occurs in the middle of the crossmember, i.e., in the longitudinal direction centrally between the crash-boxes.

In the current state of the technology, the stability of the crossmember is increased in this central area by means of the following measures. On the one hand, the wall thickness of extruded crossmembers can be increased towards the center. An alternative way is for example, that the crossmember is compressed or reshaped in the direction of its depth of its longitudinal side end sections, i.e. in the areas that connect to the crash-boxes. Alternatively, such a variation of the thickness in the direction of the depth of the crossmember can also be achieved by means of a so-called hydroforming process, so that e.g. the central area of the crossmember can be pressed apart in the direction of its depth and therefore the thickness of the central area is increased compared to the longitudinal end sections of the crossmember.

An example from the prior art is shown in FIG. 7b, which shows a connecting area to a longitudinal end of a crossmember 100 as viewed in a cross-section that is taken in a plane perpendicular to the longitudinal direction of the crossmember. The cross-sectional view shown in FIG. 7b corresponds approximately to the location that is indicated by the line A-A in FIG. 1 for a crossmember according to an embodiment of the invention.

Referring still to FIG. 7b, the crossmember 100 is composed of an extruded two-chamber hollow profile with an upper chamber 101 and a lower chamber 102. On their respective front sides the two chambers 101, 102 are limited by baffle plate 103. Fixing holes 104 are provided within the connecting areas, into each of which a screw 106 is inserted and fixed via a nut 105, which couples a front end of a crash-box 107 to the crossmember 100.

The depicted end portion is compressed in a direction of the depth of crossmember 100, so that it features a reduced thickness D compared to the central portion (not shown) of the crossmember 100. The upper-, central- and lower walls (108, 110 and 112, respectively), which limit the chambers 101 and 102 between the baffle plate 103 and a rear wall 114 of the crossmember 100, are bent by means of this compressing in the direction of its depth. The results are problems that relate in particular to the mounting situation.

Overall, the construction of all crossmembers that are known from the prior art with a higher stability in the area between the connecting areas is complex and their weight is relatively high, which can have a negative effect on vehicle fuel efficiency.

SUMMARY OF EMBODIMENTS OF THE INVENTION

In accordance with an aspect of at least one embodiment, there is provided a crossmember for a bumper, comprising: an extrusion profile base frame including two connecting areas for attaching the crossmember to a vehicle structure, the two connecting areas separated one from the other along a longitudinal direction of the crossmember, the extrusion profile base frame having a concave rear wall and having a pair of spaced-apart parallel flanges extending perpendicularly away from the rear wall and running along the longitudinal direction of the crossmember; and an extruded reinforcing element having a central thickening extending along the longitudinal direction of the crossmember, and having a pair of spaced-apart parallel flanges with convexly shaped edges, wherein in an assembled condition the reinforcing element is disposed between the at least two connecting areas of the extrusion profile base frame, one of the parallel flanges on the reinforcing element is fixedly secured to one of the parallel flanges on the extrusion profile base frame, and the other of the parallel flanges on the reinforcing element is fixedly secured to the other of the parallel flanges on the extrusion profile base frame.

In accordance with an aspect of at least one embodiment, there is provided a crossmember for a bumper, comprising: an extrusion profile base frame including at least two connecting areas, which are separated one from the other along a longitudinal direction of the crossmember, for attaching the crossmember to a vehicle structure; and an extruded reinforcing element disposed between the at least two connecting areas.

In an embodiment the crossmember comprises an extrusion profile base frame and an extruded reinforcing element. Both elements are thus produced by means of extrusion molding.

In an embodiment the reinforcing element is fixedly secured to the extrusion profile base frame, between connecting areas that are provided on the crossmember for mounting to a motor vehicle structure. Since the reinforcing element is secured to the extrusion profile base frame between the connecting areas, it is ensured that especially in between these connecting areas, in an area where a higher stability is necessary, a reinforced crossmember is provided and the corresponding longitudinal ends of the crossmember, with its connecting areas, are weight-optimized and an increased material consumption is prevented.

In an embodiment, the reinforcing element is provided on a rear side of the extrusion profile base frame. In this context the term "rear side" means the side of the crossmember that faces toward the vehicle in its installed state. Each crossmember is designed in such a way that even if it is not attached to a vehicle, it can still be determined which side of the crossmember is intended to face toward the vehicle and which side of the crossmember is intended to face away from the vehicle and toward the direction of impact. The extrusion profile base frame has a rear wall along the rear side thereof, as well as a front wall that is opposite the rear wall.

The term 'direction of its depth' and similar phraseology refers to the direction between the front wall and the rear wall of the crossmember, or vice versa, whereas "vertical direction" and similar phraseology refers to the direction between the lower side and the upper side of the crossmember, or vice versa. Just like with the front and rear side, it is also possible to differentiate a lower from an upper side of the crossmember even if it is not attached to a vehicle. This described direction/side differentiation can be determined, e.g., by means of the formation of the connecting areas and/or a predetermined bending direction of the crossmember.

In an embodiment, the extrusion profile base frame features a largely homogeneous cross-sectional thickness in the direction of its depth and/or a largely homogeneous wall thickness in its longitudinal direction.

Since the crossmember is formed as at least a two-piece component, including the extrusion profile base frame and reinforcing element, it is not necessary for the longitudinal end-sides to be compressed in the depth direction or for the central areas to be pressed apart in the depth direction by means of hydroforming, as described above for prior art crossmembers.

Alternatively or additionally it is not necessary to produce different wall thicknesses in the different sections in the longitudinal direction of the crossmember.

By means of the described embodiments, the extrusion profile base frame can be produced in a fairly simple manner by way of extrusion molding, without the need to perform any further complex processing steps, such as a compressing or widening of specific areas and/or is it also not necessary to adjust the wind force during the extrusion molding.

In an embodiment, the extrusion profile base frame can be formed largely without any compressing at its longitudinal ends in the direction of its depth and additionally or alternatively largely without any expanding in the direction of its depth in its middle section along the longitudinal direction.

In an embodiment the reinforcing element features a thickening (i.e., a section of the element that has a relatively greater material thickness compared to adjacent sections of the element) in the direction of its depth, as viewed in a cross-section taken in a plane that is perpendicular to its longitudinal direction. When the terms direction of its depth, vertical direction, longitudinal direction, rear side and front side, and similar phraseology, are used in connection with the reinforcing element, these terms are referred to in accordance to what was mentioned earlier with reference to the extrusion profile base frame. The rear side of the reinforcing element is thus referring to the side that faces toward the vehicle and the front side of the reinforcing element is thus referring to the side that faces toward the extrusion profile base frame. The direction of its depth is thus the direction between the front and rear side of the reinforcing element, or vice versa.

Thus, in at least some embodiments the reinforcing element features a thickening. This thickening is located between two material sections that are thinner relative to the thickening, and preferably runs along the longitudinal direction of the reinforcing element.

The areas that have a thinner material thickness compared to the thickening allow for an easier way of connecting, i.e., an attaching to the extrusion profile base frame, whereby the thickened section itself contributes to an increased mass inertia and thus to an increased bending moment.

In an embodiment, the thickening extends from both the front and rear sides of the reinforcing element. In this way it is possible that the increased mass inertia will have an effect over the entire length of the reinforcing element.

In an embodiment, the reinforcing element may be limited in the vertical direction on both sides by means of bent sections. These bent sections serve as mounting structures (i.e., forming a pair of parallel flanges) for attaching the reinforcing element directly and/or indirectly to the rear side of the extrusion profile base frame. By means of these bent sections the depth of the crossmember is additionally increased, in particular in the section in which the reinforcing element is intended to be, and not only by means of the thickening. Thus, the bent sections perform the function on the one hand of mounting the reinforcing element and on the other hand of providing an additional increase of the thickness in the direction of the depth of the crossmember.

In an embodiment the reinforcing element, which is produced by means of extrusion molding just like the extrusion profile base frame, is punched in a first step from an extruded profile, so that a punched part is obtained as an intermediate product. This punched part is subsequently processed by means of bending, so that it features a generally U-shaped profile at least in its middle section, when viewed in a cross-section taken in a plane that is perpendicular to the longitudinal direction.

In an embodiment the reinforcing element features a homogeneous wall thickness in the longitudinal direction, and the wall thickness varies only in the vertical direction (i.e., in the region of the thickening).

Preferably, a profile strip is first obtained after the extrusion molding, with an upper and a lower side that is bordered by narrow edges. The upper or the lower side corresponds to the respective front or rear side of the later reinforcing element.

A punching device is then pressed onto the front or rear side of the extrusion profile, in order to produce a punched part in this way. The bent sections that are then formed by means of bending, producing a pair of parallel flanges extending along the longitudinal direction.

In an embodiment, the punched part is generally an oval shape when viewed from its front and/or rear sides. By means of this oval shape it is ensured that the reinforcing element can fit onto the rear side geometry of the extrusion profile base frame after the subsequent bending procedure, if the rear side of the extrusion profile base frame features a concave bending geometry. This is because a crossmember is often curved along its longitudinal direction, thereby forming a concave rear wall that faces toward the vehicle. When the punched part is bent along a bending line that runs along its longitudinal direction, the resulting bent sections or flanges feature a front edge with a curved geometry, which corresponds to the rear side geometry of the extrusion profile base frame.

Furthermore, the longitudinal ends of the reinforcing element are preferably also bent in such a way during the bending procedure, that a concave geometry is formed along the longitudinal direction when viewed on an upper/lower edge of the reinforcing element.

In an embodiment, the reinforcing element may comprise ends in its longitudinal direction having a concave and/or convex geometry when viewed from the front and/or rear side.

In an embodiment the areas of the longitudinal ends of the reinforcing element are welded to the extrusion profile base frame, in particular to its rear side. The concave as well as the convex geometry of the ends provides relief to the welding seam.

From a procedural view, it is particularly preferred to choose a concave final geometry in order to reduce the material loss during the punching procedure. In this way the punched part can be punched in such a way that it is possible to always punch in the end sections, basically all the way towards the end of the form that is to be produced, usually without any overlapping, non-useable leftovers.

In an embodiment, the extrusion profile base frame feature flanges that protrude from its rear wall. Correspondingly, the bent sections (flanges) of the reinforcing element are located between these flanges on the extrusion profile base frame. These flanges serve as connecting points for the reinforcing element. The bent sections of the reinforcing element can correspondingly be welded or glued (i.e., adhesively bonded) in at least some sections to these flanges.

In an embodiment the bent sections of the reinforcing element are slidingly received and retained between the flanges on the extrusion profile base frame. Aligning the two pairs of flanges allows for a simple pre-configuration or assembly of the separate parts, prior to the parts being fixedly secured together by welding/adhesive bonding, etc.

For an additional or alternative mounting via some sections of the flange, the respective longitudinal ends of the reinforcing element can also be welded and/or glued in the area of the rear side of the extrusion profile base frame.

In an embodiment, the reinforcing element may have a length of less than ⅔ of the length of the space between the connecting areas.

Alternatively the length of the reinforcing element is less than ½ of the length of the space between the connecting areas, less than ¼ or less than ⅓ of the length of the space between the connecting areas. The above-mentioned sections ½ or ⅓ or ¼ can also be viewed as the respective lower limit.

By means of these variedly preferred reinforcing element lengths, it is possible to produce a relatively light crossmember as such, which is only reinforced in the area where higher bending forces are to be expected.

In an embodiment the reinforcing element is attached centrally and approximately midway between the connecting areas of the extrusion profile base frame. This means, that in longitudinal direction, the respective ends of the reinforcing element have the same distance to the corresponding connecting area, as well as alternatively or additionally that the reinforcing element can also be basically centrally positioned in vertical direction.

In accordance with an aspect of at least one embodiment, a method is also provided for fabricating a crossmember for a vehicle bumper, comprising: providing an extrusion profile base frame that is curved along a longitudinal direction thereof such that a rear wall of the extrusion profile base frame has a concave shape and a front wall of the extrusion profile base frame that is opposite the rear wall has a convex shape; forming two connecting areas on the extrusion profile base frame for mounting the crossmember to a vehicle structure, one of the two connecting areas being formed proximate each opposite end of the extrusion profile base frame, such that the two connecting areas are spaced apart one from the other along the longitudinal direction; providing an reinforcing element that is separate from the extrusion profile base frame, and fixedly securing the reinforcing element between the two connecting areas.

A crossmember that is optimized in its deformation characteristics can be produced in a simple manner by means of this method.

In an embodiment a punched part is produced from an extrusion profile in a punching step, which undergoes a bending step to form a pair of bent-over flanges on the reinforcing element. The punching and the bending steps can be performed in one device, which directly combines these two steps. Alternatively, a punching step is performed without a bending step or a bending step can be performed without punching step.

In an embodiment, the reinforcing element can be welded and/or glued at least in some sections to the extrusion profile base frame at its bent sections that were produced by means of a bending procedure and/or the reinforcing element can be welded and/or alternatively glued at its longitudinal sections directly to a rear side of the extrusion profile base frame.

This kind of method allows for a secure attaching of the reinforcing element and of the extrusion profile base frame.

BRIEF DESCRIPTION OF THE DRAWINGS

Further details and advantages of the invention can be derived from the embodiments that are illustrated in the following in conjunction with the drawings, it is shown.

DETAILED DESCRIPTION OF THE DRAWINGS

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
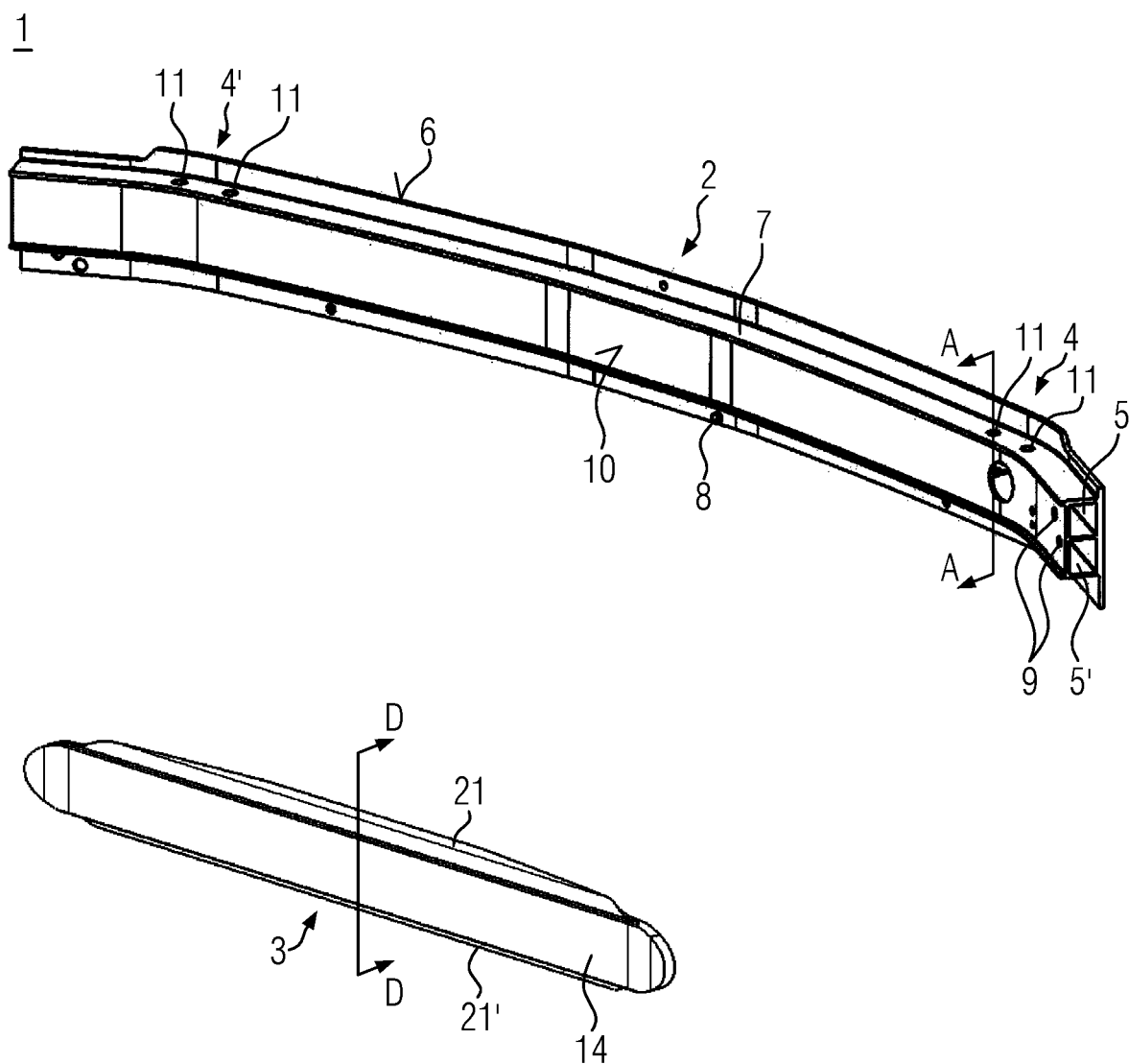
FIG. 1 is a schematic exploded view of a crossmember according to an embodiment.

FIG. 1 is an exploded view of a crossmember 1 according to an embodiment. The crossmember 1 comprises an extrusion profile base frame 2 and a reinforcing element 3. The extrusion profile base frame 2 is a two-chamber extrusion profile with an upper chamber 5 and a lower chamber 5'. On a front side thereof, the extrusion profile base frame 2 is covered with a baffle plate 6, which is also referred to as a front wall and which protrudes in a vertical direction past an upper wall 7 that closes the upper chamber 5 and past a lower wall 8 that closes the lower chamber 5'. The upper wall 7 and the lower wall 8 both protrude, at their respective rear ends, past a rear wall 10 of the extrusion profile base frame 2 and thus form respective upper and lower flanges 9. In particular, the flanges 9 are a pair of parallel flanges that extend perpendicularly from the rear wall 10 and run along the longitudinal direction of the extrusion profile base frame. Proximate each of the two longitudinal ends of the extrusion profile base frame 2 is a respective connecting area 4 and 4'.

Referring still to FIG. 1 the extrusion profile base frame 2 features a homogeneous thickness in the direction of its depth (i.e., as measured between the front wall or baffle plate 6 and the rear wall 10). Further, the wall thickness of the aforementioned walls is also substantially constant. The extrusion profile base frame 2 features a bent shape along its longitudinal direction, such that the rear wall 10 is concave and the front wall or baffle plate 6 has a convex shape. This curved shape can be produced directly during the extrusion process. Alternatively such a bending along the longitudinal direction can be produced after forming a straight, unbent profile by means of a separate bending operation.

Figure 7A:
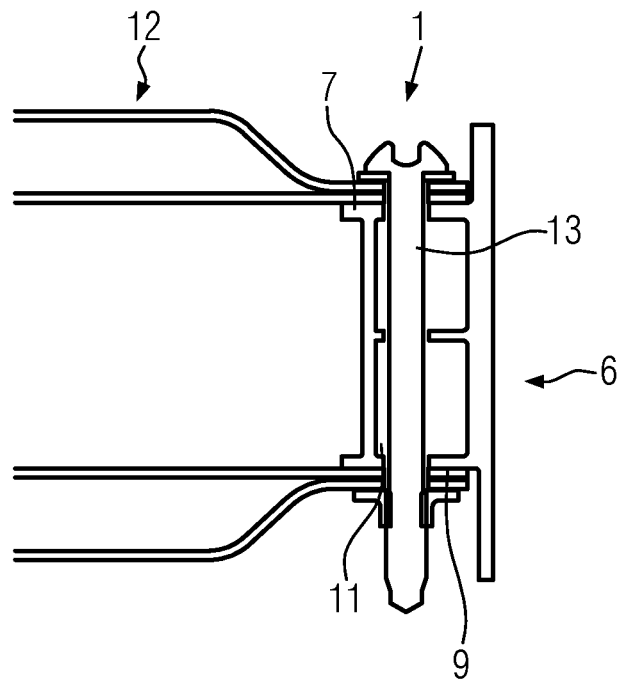
FIG. 7a is a cross-sectional view along the line A-A in FIG. 1.
Figure 7B:
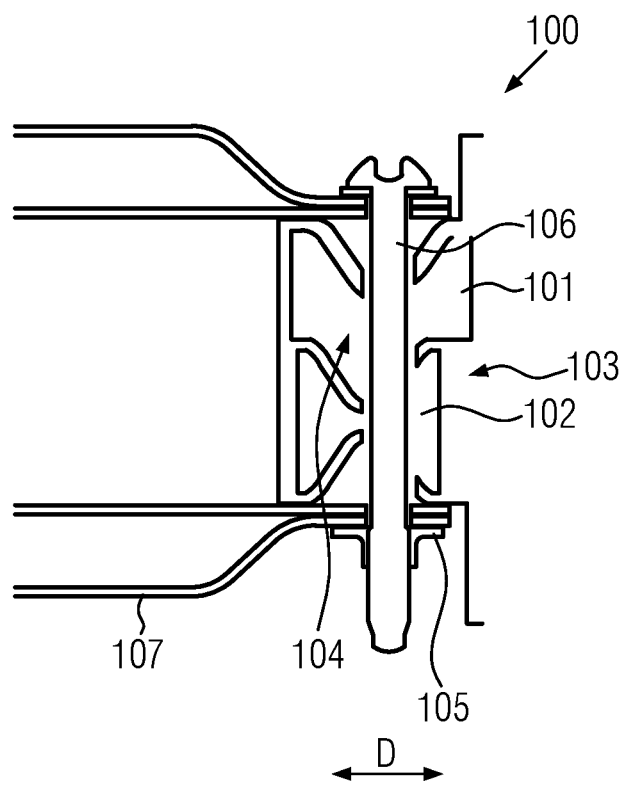
FIG. 7b is a corresponding cross-sectional view as in FIG. 7a for a crossmember known from the prior art, in which the ends on the longitudinal sides are compressed in the direction of their depth.

The extrusion profile base frame 2 has mirror-symmetry about a central plane that is perpendicular to the longitudinal direction. Pairs of mounting holes 11 are formed in the respective connecting areas 4, 4' at the opposite ends, the mounting holes 11 being aligned along a vertical direction through the two chambers 5, 5'. The connecting arrangement, such as to a crash-box 12, is depicted in FIG. 7a in a cross-sectional view taken along line A-A in FIG. 1. A screw 13 or a bolt or any other mounting device can be inserted through the corresponding mounting hole 11, and so crossmember 1 can be connected with the corresponding crashbox 12. Other ways of forming a connection, instead of the ones by means of the holes 11, are also possible.

Figure 3:
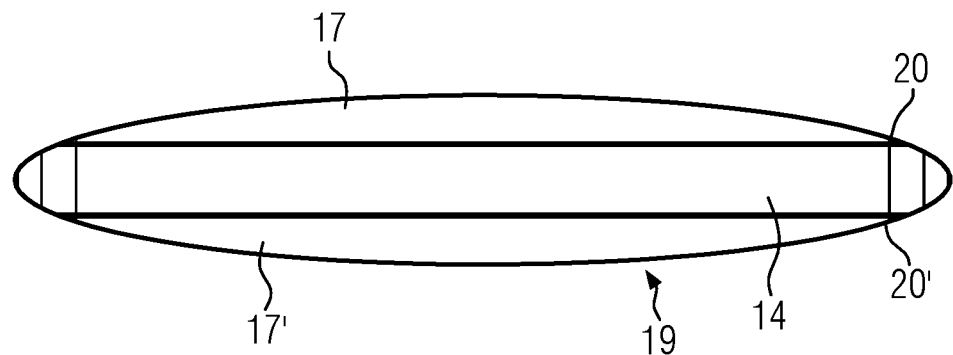
FIG. 3 is a top view on a rear side of a punched part for the production of a reinforcing element.

Referring still to FIG. 1, the entire reinforcing element 3 is made from an extrusion profile (not shown), in one piece and out of a homogeneous material. Now referring also to FIGS. 3 and 4a, the extrusion profile is punched in a punching step to form a punched part 19 and includes a central thickening 14, which is limited in the vertical direction on the upper and lower sides by thinner sections 17 and 17', respectively, having relatively smaller material thicknesses. In this specific example, the punched part 19 is oval-shaped.

Figures 4A, 4B:
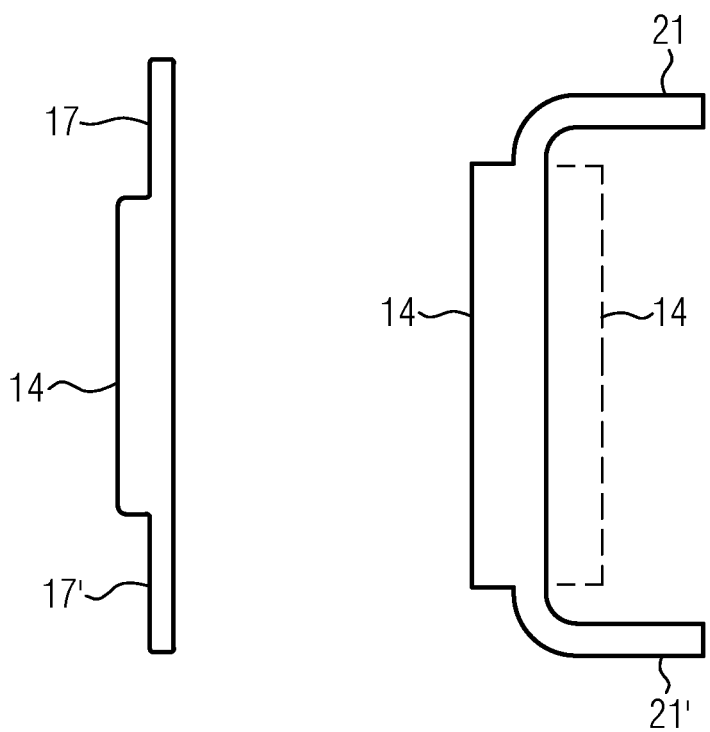
FIG. 4a is a cross-sectional view along the line B-B from FIG. 3.
FIG. 4b is a cross-sectional view of the punched part depicted in FIG. 4a after the bending of its longitudinal side edge sections.

The punched part 19 is bent at its longitudinal sides 20, 20' by means of a bending step to form bent sections 21 and 21', which are shown in FIG. 4b in a cross-sectional view taken along line D-D in FIG. 1. The reinforcing element 3 thus has a generally U-shaped form in this central area. As is depicted in FIG. 4b the thickening 14 can be formed along the outside of the reinforcing element 3 with respect to the crossmember 1, or alternatively or additionally along the inside of the reinforcing element 3 facing toward the rear wall 10 of the extrusion profile base frame 2 (as is illustrated using a dashed line in FIG. 4b). In the latter case, the thickening 14 is enclosed by the reinforcing element 3.

Since the punched part 19 has an oval shape, and its longitudinal sides 20, 20' are bent as is shown in FIG. 4b, the bent sections 21, 21' fit onto the curved rear side of the extrusion profile base frame 2, so that the front edge geometry of the bent sections 21, 21' largely corresponds to the geometry of the extrusion profile base frame 2 due to the curvature of the punched part. Since the longitudinal ends of the oval punched part 19, i.e. the thickening 14 is preferably also slightly bent during the bending step, a slightly curved reinforcing element arises when seen from the top view in order to correspond to the rear wall geometry of the extrusion profile base frame 2.

Figure 2:
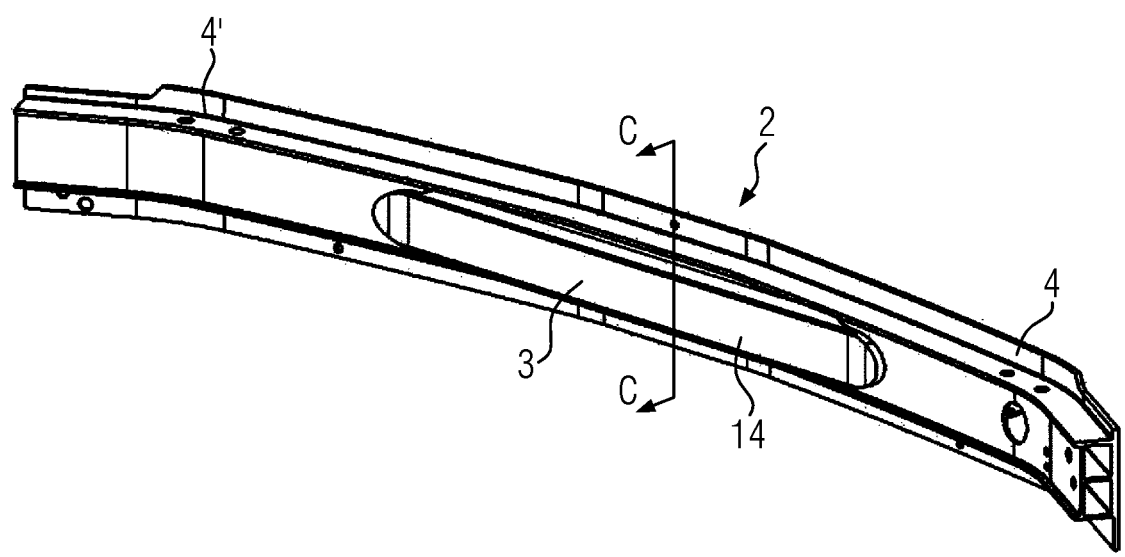
FIG. 2 shows the crossmember of FIG. 1 in its assembled form.

As is shown in FIG. 2 the reinforcing element 3 is attached along the rear side of the extrusion profile base frame 2, between the connecting areas 4 and 4' in the longitudinal direction. The reinforcing element 3 is also centered vertically between the flanges that are formed by the portions of the upper wall 7 and the lower wall 8 extending past the rear wall 10 of the extrusion profile base frame 2. In the specific example that is shown in FIG. 2 the reinforcing element 3 has an elongated panel-like shape, but other geometries are also possible. In this way an increased area moment of inertia against deforming, or an increased effective thickness in the direction of its depth is achieved in the central portion of the crossmember 1, whilst allowing the crossmember 1 to be formed with a relatively slim profile in its connecting areas 4 and 4'.

Figure 5:
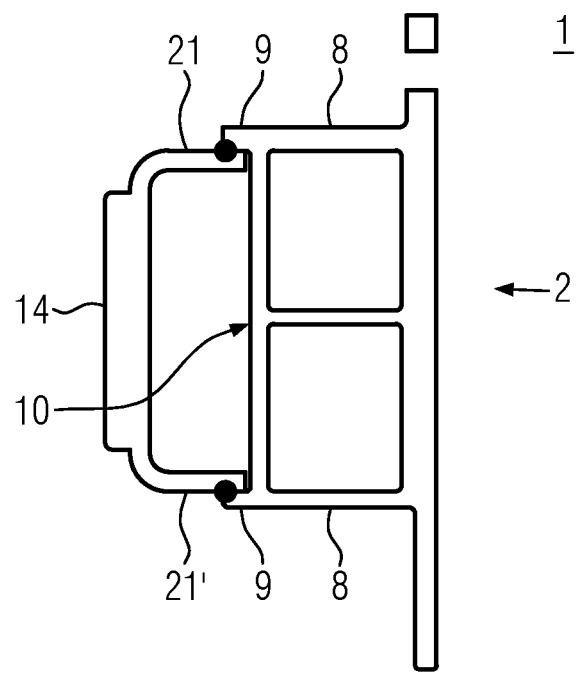
FIG. 5 is a cross-sectional view of the crossmember along the line C-C in FIG. 2.

FIG. 5 depicts a cross-sectional view of the crossmember 1 taken along the line C-C in FIG. 2. The reinforcing element 3 is attached to the rear side 10 of the extrusion profile base frame 2 such that it is approximately centered in the longitudinal direction as well as in the vertical direction. The bent sections 21, 21' are thus accommodated between the flanges 9 that are formed by the upper wall 7 and the lower wall 8. The bent sections 21 and 21' and are then welded to the flanges 9. By means of this accommodating between the flanges 9, a pre-positioning is possible and a better fastening is achieved. Alternative connecting methods include e.g. adhesive bonding (gluing) or mechanical fastening.

Figure 6:
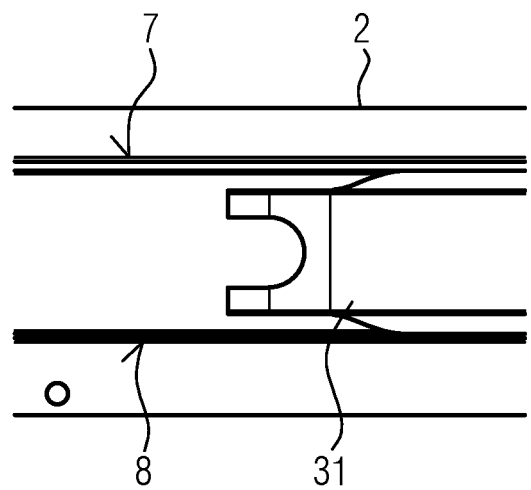
FIG. 6 is an alternative embodiment of a longitudinal end section of a connecting element.

The embodiment depicted in FIG. 1 to FIG. 5 comprises a reinforcing element 3, whose longitudinal ends are formed in a convex shape. In contrast, the section of a longitudinal end of an alternative reinforcing element 31 that is depicted in FIG. 6 features a concave-shaped end portion. Both embodiments allow for a relief by means of a welding seam. If a convex embodiment is chosen, there is usually some cutting scrap in the end sections during the punching. In the alternative depicted in FIG. 6 with a concave shaping of the end sections, the correspondingly cut extrusion profile is punched in such a way, that the respective end-sides can be preserved without any or with as little cutting scrap as possible.

The corresponding extrusion profiles, for the extrusion profile base frame as well as for the reinforcing element, can be made out of well-known materials such as e.g. aluminum, aluminum-containing alloys, magnesium, magnesium-containing alloys, titanium, titanium-containing alloys, plastic or plastic composites. The different materials may also vary for the reinforcing element and for the extrusion profile base frame, respectively. The two extrusion profiles preferably feature a basically homogeneous wall thicknesses in longitudinal direction. In accordance with the embodiment, the reinforcing element is preferably only intended for the section in between the connecting areas. In particular, the reinforcing element should not protrude beyond the connection areas. The crossmembers is preferably slightly curved towards the inside of the vehicle, as it is depicted in the embodiment. Alternatively, such a crossmember can also be straight or feature another shape. The reinforcing element is preferably intended to be arranged centrally and/or symmetrically on the extrusion profile base frame. Alternatively, the reinforcing element can also be displaced in the vertical direction in relation to the center of the extrusion profile base frame and/or in the longitudinal direction in relation to its center.

The length of the reinforcing element in the longitudinal direction is to be adapted depending on the specific requirements of a particular application. Preferably, the length is no more than ⅔ of the distance between the connecting areas, particularly ½ or even only ¼ of the distance between the connecting areas. The cross member is preferably to be attached to the vehicle structure via crash-boxes. Thus, the entire vehicle with such a crossmember structure can be in accordance with the invention as well.

While the above description constitutes a plurality of embodiments of the invention, it will be appreciated that the present invention is susceptible to further modification and change without departing from the fair meaning of the accompanying claims.

What is claimed is:

1. A crossmember for a bumper, comprising:
    an extrusion profile base frame including two connecting areas for attaching the crossmember to a vehicle structure, the two connecting areas separated one from the other along a longitudinal direction of the crossmember, the extrusion profile base frame having a concave rear wall and having a pair of spaced-apart parallel flanges extending perpendicularly away from the rear wall and running along the longitudinal direction of the crossmember; and
    an extruded reinforcing element having a central thickening extending along the longitudinal direction of the crossmember, and having a pair of spaced-apart parallel flanges with convexly shaped edges,
    wherein in an assembled condition the reinforcing element is disposed between the at least two connecting areas of the extrusion profile base frame, one of the parallel flanges on the reinforcing element is fixedly secured to one of the parallel flanges on the extrusion profile base frame, and the other of the parallel flanges on the reinforcing element is fixedly secured to the other of the parallel flanges on the extrusion profile base frame.

2. The crossmember according to claim 1, wherein the convexly shaped edges of the reinforcing element substantially match a curvature of the concave rear wall of the extrusion base profile frame.

3. The crossmember according to claim 1, wherein the flanges on the extrusion profile base frame are fixedly secured to the flanges on the reinforcing element by welding or by gluing.

4. The crossmember according to claim 1, wherein a distance between the rear wall of the extrusion profile base frame and an opposite front wall of the extrusion profile base frame, as measured along a depth direction of the extrusion profile base frame, is approximately constant along the longitudinal direction of the crossmember.

5. The crossmember according to claim 1, wherein a thickness of at least each of the rear wall and a front wall of the extrusion profile base frame, the front wall being opposite the rear wall, is approximately constant along the longitudinal direction of the crossmember.

6. The crossmember according to claim 1, wherein the flanges on the reinforcing element consist of bent-over sections of material within longitudinal sides of the reinforcing element, the longitudinal sides being adjacent to the thickening and having a material thickness that is less than a material thickness within the thickening.

7. The crossmember according to claim 1, wherein the reinforcing element has a length that is less than ⅔ of a distance between the two connecting areas.

* * * * *